T. & W. L. WINANS.
Construction of Steam-Vessels.
No. 144,243. Patented Nov. 4, 1873.
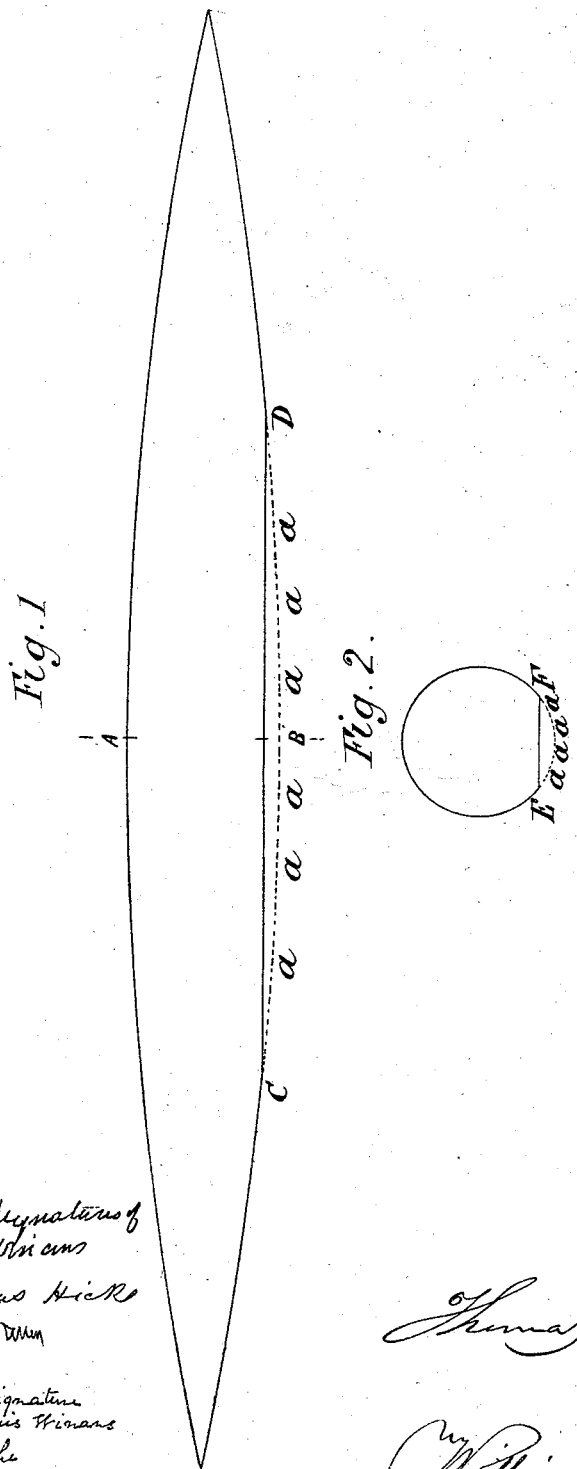

UNITED STATES PATENT OFFICE.

THOMAS WINANS AND WILLIAM LOUIS WINANS, OF BALTIMORE, MD.

IMPROVEMENT IN THE CONSTRUCTION OF STEAM-VESSELS.

Specification forming part of Letters Patent No. 144,243, dated November 4, 1873; application filed September 15, 1873.

*To all whom it may concern:*

Be it known that we, THOMAS WINANS, of Baltimore, in the State of Maryland, and WILLIAM LOUIS WINANS, of the same place, but at present residing at Brighton, in the county of Sussex, England, have invented a certain Improvement in the Hulls of Steam-Vessels, of which the following is a specification:

Our invention consists in certain improvements upon an invention for which Letters Patent of the United States of America were granted to Ross Winans and the said Thomas Winans, dated October 26, 1858, for "a new and useful improvement in the form of the hulls of steam-vessels."

The present invention relates to a form of construction which we employ for the purpose of reducing the draft of water of spindle-shaped steam-vessels, such as are described and shown in the specification of Ross and Thomas Winans' patent above referred to.

When constructing our improved vessels according to our present invention, we make them with flat or nearly flat bottoms, such as would result from cutting off a segment from the lowest submerged portion of a true spindle-shaped hull. The form will be more or less flattened, according to the circumstances of each case, such as the size of the ship, or the purpose for which it is intended, without, however, going so far as to affect materially the principles involved in the true spindle form.

In the accompanying drawings, Figure 1 is a diagram representing the outline of a longitudinal vertical section taken in the line of the axis of the vessel; and Fig. 2 is the outline of a transverse vertical section, through the line A B of Fig. 1, of one of the forms of hull patented by Ross and Thomas Winans, as aforesaid, with our present invention of a flat bottom adapted thereto.

The dotted lines *a a a a* in both figures represent the outline of the lower portion of a spindle-shaped hull, when constructed according to the invention of Ross and Thomas Winans, above referred to. The chord subtended between the letters C D, Fig. 1, and E F, Fig. 2, represents a flat bottom applied to the spindle-shaped hull, in accordance with our present improvements. Similar adaptations of a flat or nearly flat bottom may also be applied, when required, to the various other forms of spindle hulls described in the aforesaid patent of Ross and Thomas Winans.

From the above description, it is obvious that the present improvement upon Ross and Thomas Winans' original invention, which required that all the transverse sections of the hull should be true circles, affords a great advantage over the original invention, in all cases where large displacement or capacity with limited draft of water is necessary or desirable.

Without materially impairing any of the essential properties peculiar to the spindle form, the advantage would be gained of being able to use very much larger spindle vessels in water of equal depth than would be possible with the true spindle-shaped vessels constructed under the patent of Ross Winans and Thomas Winans, aforesaid.

In constructing the hulls of spindle-shaped vessels according to our present invention, the framing, which may be of any description used in ship-building, is to be bent or molded to the proper shape, and the corners formed by the intersections of the chord with the arc may be slightly rounded; and, although we have shown the bottom as perfectly flat, it will be evident that the cut-off portion may be slightly curved without departing from our invention, which has for its object the reduction of the draft of water of spindle-shaped steam-vessels.

Having now described our invention, we wish it to be understood that what we claim as our invention, and desire to secure by Letters Patent, is—

A steam-vessel constructed substantially on the plan patented by Ross and Thomas Winans, October 26, A. D. 1858, No. 21,917, and having a flat bottom, as herein described, so as to reduce the draft thereof, as set forth.

THOMAS WINANS.
WILLIAM LOUIS WINANS.

Witnesses to the signature of the said THOMAS WINANS:
   THOMAS HICKS,
      *New York, U. S. A.*
   JNO. HENRY TILLEY,
      *Newport, R. I.*

Witnesses to the signature of the said WILLIAM LOUIS WINANS:
   OSMORE LATROBE,
      *London, England.*
   SAMUEL CRONE,
      *2 Waterloo Place, Pall Mall, London.*